3,014,862
DRILLING MUD OF ENHANCED LUBRICATING PROPERTIES
Rodolfo J. Tailleur, San Tome, Venezuela, assignor to Gulf Oil Corporation, Pittsburgh, Pa., a corporation of Pennsylvania
No Drawing. Filed Sept. 23, 1957, Ser. No. 685,411
18 Claims. (Cl. 252—8.5)

This invention relates to novel compositions and more particularly to sulfurized soaps of fatty acids and fatty acid pitches. The novel sulfurized soaps are particularly useful in the preparation of drilling muds having improved properties.

Liquids having good lubricating properties and capable of being prepared at a low cost are frequently desired where the liquids are used in large volumes. Drilling fluids used in the drilling of oil and gas wells are a typical example of such liquids. The lubricating properties, herein frequently referred to as the load carrying capacity, of aqueous drilling fluids are negligible. Because of the very high loads put on the bearings of rotary drill bits and the low load carrying capacities of most drilling fluids, it is common for the bearings of the rotary drill bits to fail before the teeth on the bit are worn.

Oil-in-water emulsion drilling fluids in which an oil, usually diesel oil, is dispersed in water possess improved water loss and other characteristics important to drilling fluids. However, the oils usually used in the emulsion drilling fluids supply little lubrication at the high loads applied to the bearings. If the oil-in-water emulsion drilling fluids are modified to improve their load carrying capacity by altering the oil phase, it is important that the resulting oil phase preferentially wet the steel parts of the bit. It is also important that a stable emulsion be formed to prevent separation of the oil and water phases.

This invention resides in novel aqueous dispersions containing sulfurized alkali metal and trihydroxyalkylamino salts of unsaturated carboxylic acids containing 12 or more carbon atoms per molecule. The unsaturated carboxylic acids which can be used in the preparation of the aqueous dispersions, are the fatty acids and rosin acids such as abietic acid. The term "unsaturated" as used in this specification, does not include within its scope compounds having double bonds in the arrangement present in benzene rings. Throughout this specification the sulfurized alkali metal and trihydroxyalkylamino salts of unsaturated carboxylic acids are referred to as "sulfurized soaps" which term is used to designate salts of rosin acids as well as salts of fatty acids. Useful properties of the sulfurized soaps are the ease with which they can be dispersed in water and suspensions of clay solids in water, and their emulsifying properties allowing the preparation of stable emulsions of water and oil. The sulfurized soaps also impart valuable extreme pressure lubricating properties to aqueous fluids and oil-in-water emulsions, and are particularly useful in drilling muds to prolong the life of bearings in drill bits.

The unsaturated fatty acids containing 12 or more carbon atoms per molecule are useful starting materials for the preparation of the sulfurized soaps. Oleic, linoleic, ricinoleic, and linolenic acids are examples of some of the most commonly available unsaturated fatty acids which are useful in the preparation of the sulfurized soaps. The unsaturated fatty acids can be single refined acids, mixtures of several acids, or can be in a crude state such as exists on splitting fatty acids from glycerides in which the fatty acids are mixed with saturated fatty acids and high molecular weight compounds. Pitches of the fatty acids are preferred starting materials and are particularly useful in that they contain high molecular weight compositions which appear to enhance the extreme pressure lubricating properties of dispersions of the sulfurized soaps in water. The fatty acid pitches, which contain the necessary unsaturated fatty acids, are residual products obtained on the distillation of mixtures of fatty acids split from glycerides. The principal source of the fatty acids are the fatty glycerides such as cottonseed oil, linseed oil, castor oil, palm oil, soybean oil, lard oil, etc. Those oils are also the principal sources of the pitches used as starting materials.

Mixtures of the unsaturated fatty acids with rosin acids can also be used. Tall oil and tall oil pitches, which contain mixtures of unsaturated fatty acids and rosin acids are an important source of the fatty acids useful in this invention. Typical specifications for tall oil are 22 to 42% rosin acids and 58 to 78% fatty acids. Tallene, a tall oil pitch marketed by the West Virginia Pulp and Paper Company contains 35 to 50% fatty acids, 24 to 32% rosin acids and 22 to 32% sterols, higher alcohols, etc. Rosin acids can be used alone as well as in mixtures with fatty acids.

The alkali metal and trihydroxyalkylamine soaps of the unsaturated carboxylic acids are readily prepared by mixing an alkali metal hydroxide or a trihydroxy alkyl amine or mixtures of alkali metal hydroxides and trihydroxyalkylamines with the unsaturated acid or pitch in a conventional saponification reaction. Sodium, potassium, and lithium hydroxides can be used in the saponification of the unsaturated carboxylic acids. The sulfurized trihydroxy alkyl amine soaps are preferred compounds for use in drilling muds. They give drilling muds of improved thermal stability compared with the sulfurized alkali metal soaps. Moreover, the sulfurized trihydroxy alkyl amine soaps appear to inhibit hydration of clays. Examples of useful trihydroxy alkyl amine soaps are triethanolamine, tripropanolamine, triisopropanolamine, etc. Because it is desirable to perform the sulfurizing reaction at a temperature slightly above the melting point of sulfur the saponification is ordinarily performed at a temperature of about 120° C. to 140° C. The reaction proceeds rapidly at that temperature by simply mixing the basic material and acid at atmospheric pressure. It is preferred, when alkali metal soaps are prepared, to use aqueous solutions of alkali metal hydroxides to speed the reaction. The heating is continued for a period sufficient to boil off water liberated from the reaction product.

The saponification is carried out to a degree adequate to make the sulfurized soap readily dispersible in water. Generally it is desirable to use the basic material in quantities exceeding about 25% of the stoichiometric equivalent of the unsaturated acid. The product obtained when smaller amounts of alkaline material are used is difficult to disperse in water. If the amount of alkali metal hydroxide is 100% of the amount required for reaction wtih the unsaturated acid, a product easily dispersed in water is obtained. It is desirable, however, to avoid an excess of basic material when an alkali metal soap is prepared to avoid having free alkali metal hydroxide in the sulfurized soap. The valuable characteristic of the final product of imparting extreme pressure lubrication properties to dispersions of the composition in aqueous fluids is not greatly affected by the extent of saponification, but the lubrication properties are impaired by unneutralized alkali metal hydroxide.

The sulfurized compounds can be prepared by conventional methods for sulfurizing organic compounds. A preferred method is to mix the soap of the carboxylic acid with finely divided elemental sulfur and heat the mixture to a temperature above the melting point of the surfur. Temperatures in the range of about 240° F. to 360° F. can be used. A temperature in the range of 280° F. to 305° F. is preferred. Higher temperatures than 305° F. are sometimes objectionable in causing some dehydrogenation of the product as indicated by liberation of hydrogen sulfide during the sulfurizing step. The specific conditions employed will depend upon the particular oil from which the soap is prepared. For example, a temperature of about 300° F. is preferred in the sulfurizing of soaps of Tallene or tall oil. The heating is continued until the sulfurization is substantially complete. An indication of the extent to which the sulfur is consumed in the reaction is given by dipping a spatula into the molten reaction product. A clear dark red film is formed when the sulfur is completely reacted. If unreacted sulfur remains in the product, the film is dull, opaque, and brownish in color.

The time for which the mixture of elemental sulfur and soap are maintained at the elevated temperature is not critical. The sulfurization reaction starts promptly after the mixture of the sulfur and the soap reaches a temperature above the melting point of sulfur. The time required for completion of the sulfurization depends upon the amount of sulfur added to the reaction mixture. Maintaining the mixture at a temperature above the melting point of sulfur for a period as short as 10 minutes has been found to give a product capable of imparting greatly improved lubricating properties to aqueous dispersions. Continuing the agitation of the mixture at the elevated temperatures for periods in excess of about 2 hours ordinarily causes little further sulfurization. Any unreacted sulfur remaining in the mixture is in a finely divided state and does not interfere with the use of the sulfurized soaps.

The order of mixing the reactants is not critical. The preparation of soaps of the unsaturated carboxylic acids followed by the sulfurization has been described. Sulfur and either the basic material used in the saponification or the unsaturated carboxylic acid can be mixed initially, followed by the addition of the other reactant.

The amount of sulfur may range from about 5 to 40% of the weight of the reaction product. It is preferred to use the maximum amount of sulfur that will react with the soap. Sulfur in amounts as high as 100% of the weight of the material used to supply the unsaturated carboxylic acid has been used in the preparation of the novel composition. Some unreacted sulfur is useful in certain instances for example when the sulfurized soap is to be used in the preparation of certain types of drilling muds containing asphaltic constituents. The excess of sulfur present is available for reaction with the asphalt and may further reduce the water loss from the mud. The sulfur is important in imparting extreme pressure lubricating properties to the mud and the amount of sulfur in the sulfurized soap will influence the concentration of the sulfurized soap used in the drilling mud.

The following examples illustrate the preparation of the sulfurized soap compositions of this invention.

EXAMPLE 1

1000 grams of Tallene were mixed with 240 grams of triisopropanolamine and the mixture heated to 266° F. 200 grams of sulfur were then added to the mixture and the temperature increased to 293° F. which temperature was maintained for 2 hours. The reaction product was a pasty semi-solid material when cold. The reaction product is soluble in gas oil and is conveniently handled as a liquid when cut back with gas oil. The sulfurized soap is easily dispersible in cold water. The term "dispersible" is used to describe the product which dissolves readily to form colloidal solutions. At the relatively high concentrations, for soap solutions, at which the sulfurized soaps are used, a very stable milky dispersion is formed.

EXAMPLE 2

2000 grams of Tallene were slowly heated and 480 grams of triisopropanolamine were added with constant agitation. The mixture was heated to a temperature of 266° F. to 284° F. 200 grams of elemental sulfur were added and the mixture maintained at that temperature until sulfurization was completed as indicated by the absence of elemental sulfur particles in a sample of the reaction product.

EXAMPLE 3

500 grams of Tallene and 120 grams of triisopropanolamine were mixed and heated to a temperature of 266° F. 200 grams of elemental sulfur were heated and the heating continued with agitation to bring the mixture to a tempearture of 320° F. which temperature was maintained for ½ hour. When cooled the reaction product was a pasty solid, easily dispersible in water.

EXAMPLE 4

The procedure described in Example 3 was followed with the exception that 500 grams of sulfur were added to the hot triisopropanolamine soap of Tallene.

EXAMPLE 5

A mixture containing 500 grams of Tallene and 30 grams of triisopropanolamine was heated to a temperature of 248° F. at which temperature 50 grams of elemental sulfur was added. The amount of triisopropanolamine was 25% of the theoretical stoichiometric equivalent of the Tallene. The heating was continued with agitation to a temperature of 284° F. to 293° F. and maintained at that temperature for 2 hours. The reaction product disperses slowly in cold water and readily in hot water.

EXAMPLE 6

286 grams of triisopropanolamine were heated to 230° F. and mixed with 100 grams of sulfur. The heating was continued to 284° F. and maintained at that temperature for 1½ hours. There was no liberation of hydrogen sulfide during the heating. The sulfurized triisopropanolamine was mixed with 500 grams of tall oil which had previously been heated to 266° F. and the mixture agitated at that temperature for 1 hour. The reaction product when cooled is a pasty solid easily dispersible in water.

EXAMPLE 7

286 grams of triisopropanolamine and 100 grams of sulfur were heated to 284° F. and maintained at that temperature for 1½ hours while the sulfur was incorporated. The sulfurized triisopropanolamine was mixed with Tallex, a refined tall oil product which is over 90% abietic acid, manufactured by West Virginia Pulp and Paper Company, and heated to 284° F. The mixture was maintained at a temperature in the range of 284° F. to 302° F. for 1½ hours. The reaction product when cool is an easily pulverized solid which is readily dispersible in water.

EXAMPLE 8

338 grams of triisopropanolamine and 100 grams of sulfur were heated to a temperature of about 284° F. and maintained at that temperature until sulfurization was complete as indicated by the absence of free sulfur particles in the reaction product. The sulfurized triisopropanolamine is mixed with 500 grams of oleic acid previously heated to 284° F. and the mixture agitated for 2 hours at that temperature. The reaction product when cooled is a liquid easily dispersible in water.

EXAMPLE 9

500 grams of Tallene were mixed with 60 grams of triisopropanolamine and 10 grams of sodium hydroxide dissolved in water. The mixture was heated to a temperature of 248° F. and held at that temperature until the liberation of water from the mixture was completed. 0.3 cc. of Dow Corning Antifoam A, a silicone foam inhibitor, were added to reduce foaming during evaporation of the water from the mixture. During evaporation of the water, the temperature was increased to 284° F. Upon completion of the evaporation, 100 grams of sulfur were added, reaction product when cool is an easily pulverized solid which is readily dispersible in cold water.

EXAMPLE 10

500 grams of stearin pitch were heated to a temperature of 248° F. and mixed with 20 grams of sodium hydroxide dissolved in water. The heating was continued to a temperature of about 284° F. during which period the water evaporated. 100 grams of sulfur were mixed with the reaction product at 284° F. The temperature was raised to 302° F. and maintained at that temperature for ½ hour. The reaction product was a solid, grindable in a hammer mill, slowly dispersible in cold water, but easily dispersible in hot water.

EXAMPLE 11

500 grams of cottonseed pitch heated to 248° F. were mixed with 20 grams of sodium hydroxide dissolved in water. The mixture was heated to a temperature of 266° F. during which time water was evaporated. 100 grams of elemental sulfur were added to the mixture and the heating continued to a temperature of 311° F. which temperature was maintained for ½ hour.

EXAMPLE 12

500 grams of linseed pitch heated to a temperature of 248° F. were mixed with 20 grams of sodium hydroxide dissolved in water. The heating was continued to a temperature of 284° F. during which water was evaporated from the mixture. 100 grams of elemental sulfur were added to the soap and the temperature increased to 302° F. which temperature was maintained for ½ hour.

EXAMPLE 13

500 grams of hard soya pitch heated to a temperature of 248° F. was mixed with 20 grams of sodium hydroxide dissolved in water. The heating was continued to raise the temperature to 284° F. during which time water evaporated from the mixture. 100 grams of elemental sulfur were mixed with the soap and the heating continued to raise the temperature to 311° F. which temperature was maintained for approximately 1 hour. The reaction product when cool is not dispersible in cold water but is dispersible in hot gas oil.

EXAMPLE 14

1500 grams of Tallene heated to 248° F. were mixed with 60 grams of sodium hydroxide dissolved in about 100 cc. of water and 0.5 cc. of Dow Corning Antifoam A, a silicone foam inhibitor, and the mixture held at 248° F. Upon evaporation of the water 300 grams of elemental sulfur were added while the temperature was raised to 284° F. The mixture was further heated to a temperature of 356° F. during which period hydrogen sulfide was liberated. After cooling, the reaction product was a black solid easily pulverized and readily dispersible in cold water.

EXAMPLE 15

1000 cc. of Tallene were heated to 230° F. and mixed with 40 grams of sodium hydroxide dissolved in 200 cc. of water. The temperature was raised to the range of 284° F. to 302° F. and 200 grams of sulfur were added. At 302° F. hydrogen sulfide was liberated. When cooled, the product was a hygroscopic solid easily dispersed in water.

The sulfurized soap is readily dispersed in water and when dispersed in water containing substantially no free alkali metal hydroxide imparts extreme pressure lubricating properties to the resulting aqueous fluid. By free alkali metal hydroxide is meant alkali metal hydroxide unreacted with other constituents in the dispersion. The sulfurized soaps are added to the water in amounts effective to impart the desired lubricating properties to the resultant dispersion. Concentrations of the sulfurized soaps as low as about 0.25% have been found to be effective in giving the aqueous medium good lubricating properties. The maximum concentration of the sulfurized oil in the aqueous dispersion depends on the use to be made of the dispersion. Any increase in lubricating properties of the aqueous medium caused by concentrations of sulfurized soap above about 10% ordinarily do not justify the added cost. It is preferred to add an oil to the aqueous dispersions of the soap to prevent foaming. About 10% of the weight of the soap is sufficient oil to prevent foaming. Petroleum oils such as gas oil are preferred foam inhibitors. Higher concentrations of oil, if desired to give the dispersion other desired properties, can be used without impairing the lubricating properties of the dispersion. Other anti-foam agents such as silicones can also be used.

The sulfurized soaps, preferably used in conjunction with an oil, can be used in a wide variety of drilling fluids to improve their lubricating characteristics and thereby extend the life of drill bits. In some formations, particularly hard limestone formations containing no shale or clay, the drilling fluid may be water containing almost no clay solids. Frequently the drilling of a well is started with water as a circulating fluid. Then, when shales or clay formations are penetrated during the drillings, the circulating water picks up the natural clays to become a drilling mud. Natural clays may constitute as much as 40% by weight of the drilling mud. At other times it is desirable to mix either a natural clay or bentonite with water to form a mud to be used in the drilling. If a mud is prepared by adding bentonite to water, the concentration of the clay is much lower, generally constituting about 2 to 8% of the entire composition. Thus, the drilling fluids in which the sulfurized soaps of this invention can be incorporated may be substantially free of clay or may contain clay in amounts up to about 40% of the entire mud composition.

Preferred drilling fluids containing the sulfurized soaps of this invention are oil-in-water emulsions. The oil-in-water emulsions, like the aqueous drilling fluids described above, may contain clay in concentrations from only minor amounts up to about 40%. The oil emulsion drilling fluids are frequently defined as containing from 5 to 40% oil (Composition and Properties of Oil Well Drilling Fluids by Rogers, Gulf Publishing Company, 1953) however, there is no sharp dividing line between the aqueous drilling fluids described above and the oil-in-water emulsion drilling fluids. The oil is of value principally in aiding control of the density of the mud and its water loss properties. Oils used in emulsion drilling muds are, for example, crude petroleum, various petroleum fractions such as kerosene, gas oil, diesel oil, lubricating oil fractions, extracts from lubricating oil manufacture, and topped and reduced crudes. Cracked oils, for example, visbroken residues can also be used.

Preferred oil-in-water emulsion drilling muds contain about 5 to 25% oil phase and 4 to 25% clay solids. The term "oil phase" refers to the oil and the sulfurized soap. Concentrations of sulfurized soaps in the oil emulsion drilling muds may range from a minimum of about 0.25% of the total mud to a maximum of about 15%. The upper limit is determined by economic considerations and involves a balance between the cost of the soap and the benefits obtained. It is preferred to use between 1 and 10%, by volume, sulfurized soap in the oil emulstion drilling fluids. The amount and type of the oil will influence the amount of the sulfurized soap to be added.

Both the water base drilling fluids and the oil-in-water emulsion drilling fluids may contain other additives such as emulsifiers or thinning agents as required to adjust the properties of the muds in accordance with conventional practice. In some instances, for example when the sulfurized soaps contain very high concentrations of sulfur or when very heavy oils are used in the oil phase, or when there is a combination of factors tending to impair dispersibility, dispersion of the oil phase in the water may be difficult and the addition of other emulsifiers is often desirable to aid in the formation of a stable emulsion.

One of the important advantages of the sulfurized soaps is the ease with which they can be dispersed in water. The incorporation of the sulfurized soaps in drilling muds is accomplished by merely adding the soaps to the mud stream. Some of the sulfurized soaps are easily pulverized solids which can be added directly as solids to the jet hopper. Those sulfurized soaps that are semi-solid or pasty materials are most conveniently handled by cutting back with oil to a liquid which is added at the jet hopper or directly at the mud pits. The cutting back with oil is conveniently made immediately after the manufacture of the sulfurized soap and before the reaction product is cooled. An easily handled liquid can be produced, for example, by cutting the sulfurized triisopropanolamine soap of Tallene with 1 part of diesel oil per 3 parts of soap.

The sulfurized soaps can be mixed with an aqueous drilling fluid either before or during the drilling of a well. The addition, can for example, be made directly to an aqueous drilling fluid along with additional oil to convert the drilling fluid to an emulsion type drilling fluid. The resulting dispersion is circulated to the bottom of the well where the oil phase of the dispersion preferentially wets the bearings of the bit, thereby bringing the sulfurized soap in contact with the bearings in effective concentrations. Additions also can be made to oil-in-water emulsion drilling fluids and, in fact, this practice is followed to maintain the desired properties of the drilling fluid.

It has been found that the Timken lubricant testing machine will provide an excellent indication of the effectiveness of the drilling mud in reducing wear of bearings in drill bits. The Timken machine is widely used in the testing of lubricating oils to determine the load carrying capacity of the lubricants. Field tests have shown an excellent correlation between the results obtained on a Timken machine and results obtained in the actual drilling of wells; hence the load carrying capacity of the drilling muds indicated by tests on the Timken machine are employed in evaluating the lubrication properties of drilling muds. The tests for determining the other characteristics essential to drilling muds such as gel strength, viscosity, surface tension, and absence of foaming are not affected by the presence of the sulfurized soaps in the drilling muds.

In a specific example of the use of the sulfurized soaps in the drilling of a well in the Mata field in eastern Venezuela, muddy water is used in the initial drilling through the unconsolidated formations to a depth of 2000 feet at which depth surface casing is set. The use of water as the drilling fluid is continued as the cement plug is drilled from the lower end of the casing. At this time the volume of fluid is approximately 1000 barrels plus the volume in the casing. Drilling is continued below the shoe and the water gradually picks up clay to become a mud. During this phase of the drilling, sulfurized triisopropanolamine salt of Tallene, containing 24% trisopropanolamine by weight of the Tallene and 20% sulfur by weight of the Tallene cut back in ratio of 3 parts of sulfurized soap to 1 part of gas oil, is added to the drilling mud in the hopper. 60 barrels of the sulfurized soap-gas oil mixture are added at this time with 30 barrels of gas oil to give an oil-in-water emulsion mud with a load carrying capacity over 100 on the Timken machine. Drilling is continued to the total depth of 12,000 feet with the resulting oil-in-water emulsion mud. Water is added to the mud as required to maintain the necessary volume of mud of the desired viscosity. Gas oil and the sulfurized soap are added periodically to maintain a mud density of approximately 74 pounds per cubic foot and the load carrying capacity of the mud in the desired range.

The following Table I lists drilling mud compositions in which the sulfurized soaps of this invention are incorporated. The heading "Mud Type" refers to the aqueous phase of the mud with which the sulfurized soaps or the sulfurized soaps and oil are mixed. References to "6% Bentonite" are to aqueous suspensions containing 6% by weight of bentonite, a standard composition used in the preparation and testing of drilling mud additives.

The heading "Total Oil Phase" indicates the percent by volume of the sum of the sulfurized soap and any petroleum oil added in the preparation of the mud. The sulfurized soap is considered to be in the oil phase of the mud.

The subheading "Example No." under the heading "Sulfurized Soap" refers to the examples set forth above in which the preparation of the sulfurized soap is described in detail. The subheading "Carboxylic Acid" refers to either the unsaturated acid used or the starting material supplying the unsaturated acid. Under the subheading "Base" the abbreviation "TIP" refers to triisopropanolamine.

Under the heading "Soap:Oil, Type of Oil" are listed the ratios of the soap to the petroleum oil in the drilling mud. The type of oil refers to the particular petroleum oil. The abbreviation CO refers to crude oil, DO refers to diesel oil, GO refers to gas oil, NO refers to compositions in which there is no petroleum oil added and BC refers to Bunker C oil.

Under the heading "Timken Test" is listed the load carrying capacity in pounds of the drilling mud as determined on the Timken lubricant testing machine. Readings of 100 indicate the drilling mud had a load carrying capacity in excess of 100 pounds. Readings below 100 indicate the load at which the drilling mud failed as a lubricant. The abbreviation BL refers to borderline results.

*Table I*

| Mud No. | Mud type | Total oil phase, percent vol. | Sulfurized soap | | | | Soap:Oil, type of oil | Timken l.c.c., lb. | Density lb./cu. ft. | Water loss |
|---|---|---|---|---|---|---|---|---|---|---|
| | | | Example No. | Carboxylic acid | Base | Percent S | | | | |
| 1 | Water | 12 | 1 | Tallene | TIP | 20 | 5:1 GO | 100 | 62.3 | |
| 2 | do | 6 | 1 | do | TIP | 20 | 5:1 GO | 100 | 61.5 | |
| 3 | do | 1.5 | 1 | do | TIP | 20 | 5:1 GO | 100 | 62.5 | |
| 4 | do | .375 | 1 | do | TIP | 20 | 5:1 GO | 100 | 62.5 | |
| 5 | do | 10 | 2 | do | TIP | 10 | NO | 80 | | 5.4 |
| 6 | do | 10 | 1 | do | TIP | 20 | NO | 100 | | |
| 7 | 6% bentonite | 10 | | (¹) | | | DO | 5 | 64.5 | 7.0 |
| 8 | 3% bentonite | 9 | 1 | Tallene | TIP | 20 | 5:1 GO | 100 | 63.0 | 8.6 |
| 9 | do | 1.5 | 1 | do | TIP | 20 | 5:1 GO | 100 | 62.3 | |
| 10 | High lime-caustic | 10 | | do | NaOH | 0 | 1:5 GO | 5 | | |
| 11 | 6% bentonite | 10 | | do | TIP | 0 | 1:1 GO | 15 | 63.9 | 6.7 |
| 12 | do | 10 | 5 | do | TIP | 10 | 1:1 GO | 100 | 63.1 | 7.9 |
| 13 | do | | | | | | | 5 | | |
| 14 | do | 10 | 1 | Tallene | TIP | 20 | NO | 100 | 58.0 | 6.9 |
| 15 | do | 10 | 1 | do | TIP | 20 | 1:1 GO | 100 | 62.5 | 12.2 |
| 16 | do | 10 | 1 | do | TIP | 20 | 1:3 GO | 100 | 62.7 | 12.5 |
| 17 | do | 10 | 1 | do | TIP | 20 | 1:7 GO | ² 100 | 60.4 | 12.0 |
| 18 | do | 10 | 2 | do | TIP | 10 | 1:1 GO | 100 | 63.2 | 9.2 |
| 19 | do | 10 | 3 | do | TIP | 40 | 1:7 BC | 100 | 59.6 | 6.5 |
| 20 | do | 10 | 4 | do | TIP | 100 | 1:15 BC | 85 | 58.0 | 6.2 |

See footnotes at end of table.

*Table I—Continued*

| Mud No. | Mud type | Total oil phase, percent vol. | Sulfurized soap | | | | Soap:Oil, type of oil | Timken l.c.c., lb. | Density lb./cu. ft. | Water loss |
|---|---|---|---|---|---|---|---|---|---|---|
| | | | Example No. | Carboxylic acid | Base | Percent S | | | | |
| 21 | Water | 10 | 6 | Tall oil | TIP | 20 | 2:1 GO | ² 100 | 61.4 | |
| 22 | 6% bentonite | 10 | 6 | ___do___ | TIP | 20 | 2:1 GO | 100 | 63.6 | 3.2 |
| 23 | ___do___ | 10 | 7 | Tallex | TIP | 20 | 2:1 GO | 100 | 62.0 | 14 |
| 24 | Water | 10 | 8 | Oleic | TIP | 20 | 2:1 GO | 100 | | |
| 25 | 6% bentonite | 10 | 8 | ___do___ | TIP | 20 | 2:1 GO | 100 | 64.0 | 4.2 |
| 26 | Water | 10 | 9 | Tallene | TIP+NaOH | 20 | NO | 100 | | 6.6 |
| 27 | ___do___ | 5 | 9 | ___do___ | TIP+NaOH | 20 | NO | 80 | | |
| 28 | 4% bentonite | 15 | 9 | ___do___ | TIP+NaOH | 20 | 2:1 GO | 100 | | 7.1 |
| 29 | Mosca field | 10 | 1 | ___do___ | TIP | 20 | 1:1 GO | 100 | 75.2 | 5.15 |
| 30 | Yopales field | 15 | 1 | ___do___ | TIP | 20 | 1:1 GO | 95 | 71.9 | 5.1 |
| 31 | Zorro field | 14 | 1 | ___do___ | TIP | 20 | 3:5 GO | 90 | 64.5 | |
| 32 | 6% bentonite | 10 | 10 | Stearin | NaOH | 20 | 1:3 GO | ² 100 | 63.1 | 7.45 |
| 33 | ___do___ | 10 | 11 | Cottonseed | NaOH | 20 | 1:1 GO | 100 | 63.5 | 4.95 |
| 34 | ___do___ | 10 | 12 | Linseed | NaOH | 20 | 1:3 GO | 100 | 63.4 | 9.6 |
| 35 | ___do___ | 10 | 13 | Soya | NaOH | 20 | 1:1 GO | 100 | 63.5 | 5.05 |
| 36 | Yopales field | 8 | 14 | Tallene | NaOH | 20 | 1:1 CO | 100 | 67.3 | 10.6 |
| 37 | Water | 10 | | ___do___ | NaOH | 20 | 1:1 BC | 100 | | |

¹ Sodium soap of mahogany acid emulsifier.
² Borderline.

Muds 1 through 6 show the effect of adding sulfurized triisopropanolamine soap of Tallene to water in concentrations of the sulfurized soap ranging from 12% down to .375%. In each of the drilling muds 1 through 4, the load carrying capacity was greater than 100 pounds. Muds 5 and 6 contain only water and the sulfurized soap. Mud 6, which like muds 1 through 4, contains the sulfurized soap having 20% sulfur also has a load carrying capacity in excess of 100 pounds.

Mud 13 is a water base mud containing 6% bentonite alone. The Timken test indicated failure of the mud as a lubricant when a load of 5 pounds, the lowest load tested, was put on the Timken machine. Mud 7 was an oil-in-water emulsion mud containing 6% bentonite and 10% diesel oil but no sulfurized soap. Mud 7 also failed at 5 pounds.

Muds 10 and 11 contained unsulfurized alkali metal soaps of Tallene and unsulfurized triisopropanolamine soap of Tallene respectively. Neither mud had any substantial load carrying capacity. Mud 11, the best of the two muds failed at a load of 15 pounds. The addition of 10% sulfur to the triisopropanolamine soap of Tallene increased the load carrying capacity to over 100, as shown by mud number 12.

Muds 14 through 17 show the lack of criticality of changes in the petroleum oil concentration of the oil phase in a 6% bentonite mud containing a total oil phase of 10%. All of the muds had load carrying capacities of 100 or more. Mud 17 in which the ratio of sulfurized soap to gas oil was 1 to 7 had a borderline pass on the Timken of 100. These muds covered a range of gas oil from 0 to about 9%.

The sulfurized soap in muds 17 through 20 contained sulfur in amounts from 10 to 100% by weight of the carboxylic acid material. With the exception of mud number 20 in which the sulfurized soap only constituted about 6% of the oil phase, or 0.6% of the entire mud composition, the load carrying capacity of the muds were 100 or greater.

Muds 21 through 25 were prepared from the sulfurized soaps of different acids. Mud 23 contained the triisopropanolamine salt of Tallex which is substantially pure abietic acid. Muds 24 and 25 contained sulfurized soaps of oleic acid. The sulfurized soaps of the different unsaturated acids increased the load carrying capacity of the muds to more than 100 pounds.

Muds 26 through 28 show that sulfurized mixed alkali metal and trihydroxyalkylamine soaps are effective in increasing the load carrying capacity of drilling muds. Except for mud 27, which was really only an aqueous dispersion, and contained only a total of 5% oil phase, the load carrying capacity exceeded 100 pounds.

Muds 29 through 31 and 36 were prepared from field muds containing natural clays picked up by the drilling mud during drilling of wells in the Mosca, Yopales and Zorro fields in Venezuela. The addition of either sulfurized triisopropanolamine soap of Tallene or sulfurized sodium soap of Tallene gave muds having high load carrying capacities. Mud 36 was prepared with a 32.8° A.P.I. crude oil as the petroleum oil.

Muds 32 through 35 illustrate the suitability of different pitches as starting materials in the preparation of the sulfurized soaps. The muds containing the sulfurized pitches of soaps of stearin, cottonseed pitch, linseed pitch, or soya pitch had load carrying capacities of 100 or more.

The sulfurized soaps of this invention are effective not only in increasing the load carrying capacity of drilling muds but act as wetting agents which cause steel contacted by the drilling mud to be preferentially wet by the oil phase. In this manner, the constituents of the drilling mud effective in providing lubrication are brought into contact with the parts to be lubricated. The sulfurized soaps also have emulsifying properties allowing the preparation of stable muds. Thus, in the single sulfurized soap composition, an additive for drilling muds is available having combined properties of extreme pressure lubricating agents, wetting agents, and emulsifiers.

I claim:

1. An aqueous dispersion characterized by enhanced extreme pressure lubricating properties comprising water and a sulfurized reaction product of a basic material selected from the group consisting of alkali metal hydroxides and trihydroxyalkylamines and an unsaturated carboxylic acid having at least 12 carbon atoms per molecule, the sulfurized product containing 5–40% sulfur and being present in amounts effective to impart enhanced lubricating properties to the dispersion up to about 5% of the dispersion.

2. An aqueous dispersion characterized by enhanced lubricating properties comprising water and a sulfurized reaction product of a basic material selected from the group consisting of alkali metal hydroxides and trihydroxyalkylamines and an unsaturated carboxylic acid having at least 12 carbon atoms per molecule, the sulfurized product containing 5–40% sulfur and being present in amounts effective to impart enhanced lubricating properties to the dispersion up to about 5% of the dispersion, and a petroleum oil in a concentration between 10% of the concentration of the sulfurized product and 40% of the total aqueous dispersion.

3. An aqueous dispersion comprising water, a sulfurized reaction product of triisopropanolamine and a tall oil pitch, and a petroleum oil, said sulfurized reaction product containing 5–40% sulfur and constituting about 0.25 to 5% of the dispersion, and the petroleum oil being at least about 10% of the amount of sulfurized product and not exceeding about 40% of the total aqueous dispersion.

4. A drilling mud characterized by enhanced lubricating properties comprising water, clay solids, and the sulfurized reaction product of a basic material selected from the group consisting of alkali metal hydroxides and trihydroxyalkylamines and an unsaturated carboxylic acid having at least 12 carbon atoms per molecule, said sulfurized reaction product containing 5–40% sulfur and constituting about 0.25–10% of the drilling mud.

5. A drilling mud characterized by enhanced lubricating properties comprising water, clay solids, and the sulfurized reaction product of a basic material selected from the group consisting of alkali metal hydroxides and trihydroxyalkylamines and an unsaturated carboxylic acid having at least 12 carbon atoms per molecule and a petroleum oil, sulfurized reaction product containing 5–40% sulfur and constituting 0.25–15% of the drilling mud, the amount of said petroleum oil being at least 10% of the sulfurized reaction product but not exceeding 40% of the total drilling mud.

6. A drilling mud of enhanced lubricating properties comprising an aqueous suspension of clay solids, a sulfurized reaction product of triisopropanolamine and tall oil pitch, and a petroleum oil, the sulfurized reaction product containing 5–40% sulfur and being present in amounts effective to enhance the lubricating properties of the drilling mud up to about 15% of the drilling mud and the petroleum oil constituting about 5 to 40% by volume of the drilling mud.

7. A drilling mud of enhanced lubricating properties comprising an aqueous dispersion of clay solids, the sulfurized reaction product of an alkali metal hydroxide and an unsaturated carboxylic acid having at least 12 carbon atoms per molecule, and a petroleum oil, the sulfurized reaction product containing 5–40% sulfur and being present in amounts effective to enhance the lubricating properties of the drilling mud up to about 15% of the drilling mud, and the oil being present in amounts ranging from about 10% of the sulfurized product to 40% of the drilling mud.

8. An aqueous dispersion of enhanced extreme pressure lubricating properties comprising a sulfurized alkali metal soap of an unsaturated carboxylic acid having at least 12 carbon atoms per molecule dispersed in water, the concentration of the sulfurized soap ranging from about 0.25 to 5% of the dispersion.

9. A drilling mud having enhanced lubricating properties comprising an aqueous dispersion of clay solids, about 0.25 to 15% of a sulfurized soap of triisopropanolamine and an unsaturated carboxylic acid having at least 12 carbon atoms per molecule, the sulfur content of the sulfurized soap being in the range of 5 to 40%, and a petroleum oil, the amount of oil being in the range from about 1/10 of the amount of the sulfurized soap to about 40% of the drilling mud.

10. A drilling mud as set forth in claim 9 in which the sulfurized soap is the sulfurized soap of triisopropanolamine and tall oil.

11. A drilling mud as set forth in claim 9 in which the sulfurized soap is the sulfurized soap of triisopropanolamine and oleic acid.

12. A drilling mud as set forth in claim 9 in which the sulfurized soap is the sulfurized soap of triisopropanolamine and cottonseed pitch.

13. A drilling mud as set forth in claim 9 in which the sulfurized soap is the sulfurized soap of triisopropanolamine and linseed pitch.

14. A drilling mud of enhanced lubricating properties comprising an aqueous dispersion of clay solids, the sulfurized reaction product of potassium hydroxide and an unsaturated carboxylic acid having at least twelve carbon atoms per molecule, said reaction product containing 5–40% sulfur and being substantially devoid of free potassium hydroxide, and a petroleum oil, the sulfurized reaction product being present in amounts to enhance the lubricating properties of the drilling mud between about 0.25 and 15% of the drilling mud and the concentration of the petroleum oil being between about 10% of the concentration of the sulfurized reaction product and 40% of the entire drilling mud.

15. A drilling mud as set forth in claim 14 in which the sulfurized reaction product is the sulfurized reaction product of potassium hydroxide and tall oil pitch.

16. In a process for drilling a well with rotary drill bits, the method comprising incorporating in an aqueous drilling fluid a petroleum oil and a sulfurized soap of an unsaturated carboxylic acid having more than 12 carbon atoms per molecule and a basic material selected from the group consisting of alkali metal hydroxides and trihydroxyalkylamines to form a dispersion of oil and water, said sulfurized soap containing 5% to 40%, by weight, sulfur, the amount of the sulfurized soap being effective to impart extreme pressure lubricating characteristics to the emulsion, pumping the dispersion to the bottom of the well, contacting the bearings of the drill bit with the dispersion whereby the bearings are preferentially wet with the oil phase of the dispersion, and circulating the dispersion from the bottom of the hole to the well head.

17. The process as set forth in claim 16 in which the sulfurized soap is the sulfurized soap of triisopropanolamine and tall oil pitch.

18. In a process for drilling a well with rotary drill bits the method comprising incorporating in an aqueous drilling fluid, petroleum oil and a sulfurized soap of potassium hydroxide and tall oil pitch to form a dispersion of oil and water, the sulfurized soap containing 5 to 40% sulfur, the sulfurized soap being present in the aqueous drilling fluid in a concentration effective to impart extreme pressure lubricating characteristics to the drilling fluid between 0.25 and 15% of the drilling fluid, the concentration of the petroleum oil being between 10% of the concentration of the reaction product and 40% of the total dispersion, pumping the resulting dispersion of oil and sulfurized soap in the aqueous drilling fluid to the bottom of the well, contacting the bearings of the drill bit with the dispersion, and circulating the dispersion from the bottom of the hole to the well head.

References Cited in the file of this patent

UNITED STATES PATENTS

| | | |
|---|---|---|
| 2,257,752 | Lincoln et al. | Oct. 7, 1941 |
| 2,353,169 | Lincoln et al. | July 11, 1944 |
| 2,629,721 | Sunde | Feb. 24, 1953 |
| 2,644,810 | Beretvas | July 7, 1953 |
| 2,644,825 | Beretvas | July 7, 1953 |
| 2,703,318 | Waddey et al. | Mar. 1, 1955 |
| 2,731,415 | Hook et al. | Jan. 17, 1956 |
| 2,773,030 | Tailleur | Dec. 4, 1956 |
| 2,799,646 | Lacey et al. | July 16, 1957 |
| 2,824,067 | Farbak et al. | Feb. 18, 1958 |